(12) United States Patent
Kitazawa

(10) Patent No.: US 12,322,995 B2
(45) Date of Patent: Jun. 3, 2025

(54) ELECTRIC POWER SUPPLY SYSTEM HAVING A BIDIRECTTIONAL ELECTRIC POWER CONVERSION DEVICE AND A CONTROL DEVICE THAT EXECUTES A FIRST PRECHARGE PROCESSING

(71) Applicant: TOYOTA JIDOSHA KABUSHIKI KAISHA, Toyota (JP)

(72) Inventor: Osamu Kitazawa, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 242 days.

(21) Appl. No.: 18/104,626

(22) Filed: Feb. 1, 2023

(65) Prior Publication Data

US 2023/0336087 A1 Oct. 19, 2023

(30) Foreign Application Priority Data

Apr. 18, 2022 (JP) .................. 2022-068298

(51) Int. Cl.
*B60L 3/00* (2019.01)
*B60L 53/20* (2019.01)
(Continued)

(52) U.S. Cl.
CPC .............. *H02J 7/02* (2013.01); *B60L 3/0046* (2013.01); *B60L 53/20* (2019.02); *H02J 7/0031* (2013.01);
(Continued)

(58) Field of Classification Search
CPC .. H02M 3/33584; B60L 3/0046; B60L 58/10; H02J 7/02; H02J 2310/48; H02J 7/345; H02J 2207/20; H02J 7/0031
See application file for complete search history.

(56) References Cited

U.S. PATENT DOCUMENTS 9,290,105 B2 * 3/2016 Zhao ..................... H02J 7/0063
2009/0108674 A1 4/2009 Ozaki et al.
(Continued)

FOREIGN PATENT DOCUMENTS

JP 2009-131077 A 6/2009
JP 2014-075853 A 4/2014
(Continued)

OTHER PUBLICATIONS

EP4265473 Search Opinion, Sep. 22, 2023, EPO (Year: 2023).*

*Primary Examiner* — Sean Kayes
*Assistant Examiner* — Jennifer C Caulk
(74) *Attorney, Agent, or Firm* — Dinsmore & Shohl LLP

(57) ABSTRACT

An electric power supply system includes an electric power storage device, a first relay provided between a first electric power line pair connected to the electric power storage device and a second electric power line pair connected to electrical equipment, a bidirectional electric power conversion device that is configured to be able to bidirectionally convert electric power between the second electric power line pair and an electric power facility outside of a vehicle, a first capacitor provided between the second electric power line pair, and a control device configured to execute first precharge processing of charging the first capacitor prior to turning on the first relay. The bidirectional electric power conversion device includes a switching device. The control device starts the first precharge processing when the bidirectional electric power conversion device is activated.

4 Claims, 6 Drawing Sheets

(51) Int. Cl.
*H02J 7/00* (2006.01)
*H02J 7/02* (2016.01)
*H02J 7/34* (2006.01)
*H02M 3/335* (2006.01)

(52) U.S. Cl.
CPC .......... *H02J 7/345* (2013.01); *B60L 2210/10* (2013.01); *H02J 2207/20* (2020.01); *H02M 3/33584* (2013.01)

(56) References Cited

U.S. PATENT DOCUMENTS

| | | | |
|---|---|---|---|
| 2014/0028256 A1* | 1/2014 | Sugiyama | B60L 53/22 320/109 |
| 2014/0203634 A1* | 7/2014 | Sugiyama | B60L 53/22 307/10.1 |
| 2015/0311797 A1* | 10/2015 | Okamatsu | H02M 3/158 323/271 |
| 2015/0357917 A1 | 12/2015 | Okamatsu et al. | |
| 2019/0181633 A1 | 6/2019 | Nozawa | |

FOREIGN PATENT DOCUMENTS

| | | |
|---|---|---|
| JP | 2019-106800 A | 6/2019 |
| WO | 2014/119307 A1 | 8/2014 |

\* cited by examiner

ELECTRIC POWER SUPPLY SYSTEM HAVING A BIDIRECTTIONAL ELECTRIC POWER CONVERSION DEVICE AND A CONTROL DEVICE THAT EXECUTES A FIRST PRECHARGE PROCESSING

CROSS-REFERENCE TO RELATED APPLICATION

This application claims priority to Japanese Patent Application No. 2022-068298 filed on Apr. 18, 2022, incorporated herein by reference in its entirety.

BACKGROUND

1. Technical Field

The present disclosure relates to an electric power supply system, and more particularly to an electric power supply system connected to electrical equipment.

2. Description of Related Art

Japanese Unexamined Patent Application Publication No. 2009-131077 (JP 2009-131077 A) discloses a vehicle. This vehicle includes an electric power storage device, a system main relay (SMR), an inverter, a motor, and a charging device. The SMR is provided between the electric power storage device and the inverter. The inverter drives the motor. The charging device is connected to an electric power line pair between the SMR and the inverter, and charges the electric power storage device using electric power from an electric power supply outside of the vehicle.

SUMMARY

There are cases in which a charging device, such as that described above, is configured with a bidirectional electric power conversion device that can also perform electric power feeding to an electrical facility outside of the vehicle. Unlike electric power conversion devices that have charging-only functions (e.g., rectifier circuits), bidirectional electric power conversion devices include switching devices connected to electric power line pairs through which charging or feeding electric power flows, and driving circuits thereof. During activation of the bidirectional electric power conversion device, the electric power supply of the driving circuit supplies operating electric power to the driving circuit, so that the switching devices are maintained in an off state. However, voltage may be applied to the electric power line pair from this electric power supply.

Various kinds of problems may occur when unintended voltage is applied to the electric power line pair to which electrical equipment such as an inverter is connected, when the bidirectional electric power conversion device is activated prior to the SMR being turned on.

The present disclosure can solve the above problems, and in an electric power supply system connected to electrical equipment, a situation can be averted in which unintended voltage is applied to the electrical equipment when a bidirectional electric power conversion device is activated.

An electric power supply system according to one aspect of the present disclosure is connected to electrical equipment. The electric power supply system includes an electric power storage device, a first relay, a bidirectional electric power conversion device, a first capacitor, and a control device. The first relay is provided between a first electric power line pair and a second electric power line pair, the first electric power line pair being connected to the electric power storage device and the second electric power line pair being connected to the electrical equipment. The bidirectional electric power conversion device is connected to the second electric power line pair via a third electric power line pair and is configured to be able to bidirectionally convert electric power between the second electric power line pair and an electric power facility outside of a vehicle. The first capacitor is provided between the second electric power line pair. The control device is configured to execute first precharge processing of charging the first capacitor prior to turning on the first relay. The bidirectional electric power conversion device includes a switching device connected to the third electric power line pair. The control device starts the first precharge processing when the bidirectional electric power conversion device is activated.

When the bidirectional electric power conversion device is activated, there is a possibility that voltage will be applied to the second electric power line pair from the electric power supply for the driving circuit for the switching device of the bidirectional electric power conversion device. As a result, there is a possibility that an unintended voltage will be applied to the electrical equipment. According to the above configuration, precharging of the first capacitor and application of voltage from the bidirectional electric power conversion device to the second electric power line pair are executed simultaneously when the bidirectional electric power conversion device is activated. The voltage applied from the bidirectional electric power conversion device to the second electric power line pair is sufficiently smaller than the voltage of the electric power for precharging the first capacitor. Accordingly, when the first precharge processing is started as described above, the voltage from the bidirectional electric power conversion device to the second electric power line pair is substantially masked by the voltage of the electric power for precharging the first capacitor. Thus, the effects on the electrical equipment due to the application of voltage from the bidirectional electric power conversion device to the second electric power line pair can be suppressed. As a result, a situation can be averted in which an unintended voltage is applied to the electrical equipment when the bidirectional electric power conversion device is activated prior to the SMR being turned on.

In the electric power supply system according to the aspect described above, the bidirectional electric power conversion device may include the switching device, a driving circuit, and a bootstrap circuit. The driving circuit may drive the switching device. The bootstrap circuit may supply operating electric power to the driving circuit.

According to the above configuration, the configuration of the bidirectional electric power conversion device can be simplified.

The electric power supply system according to the above aspect may further include a charging device, a second relay, and a second capacitor. The charging device may be connected to the first electric power line pair and be configured to convert electric power supplied from the electric power facility to charge the electric power storage device. The second relay may be provided between the first electric power line pair and a fourth electric power line pair connected to the charging device. The second capacitor may be provided between the fourth electric power line pair. The control device may be configured to further execute second precharge processing of charging the second capacitor prior to turning on the second relay. The control device may start the first precharge processing prior to the second precharge processing when both the bidirectional electric power conversion device and the charging device are activated.

If the second precharge processing is started prior to the first precharge processing when both the bidirectional electric power conversion device and the charging device are activated, there is a possibility that voltage will be applied from the bidirectional electric power conversion device to the second electric power line pair prior to precharging of the first capacitor. As a result, there is a possibility that an unintended voltage will be applied to the electrical equipment. Such a situation can be averted by employing the above configuration.

According to the present disclosure, in an electric power supply system connected to electrical equipment, a situation can be averted in which unintended voltage is applied to the electrical equipment when the bidirectional electric power conversion device is activated.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of the present disclosure will be described in detail below with reference to the drawings. Like or corresponding portions are denoted by like signs throughout the drawings, and description thereof will not be repeated.

Embodiment

Figure 1:
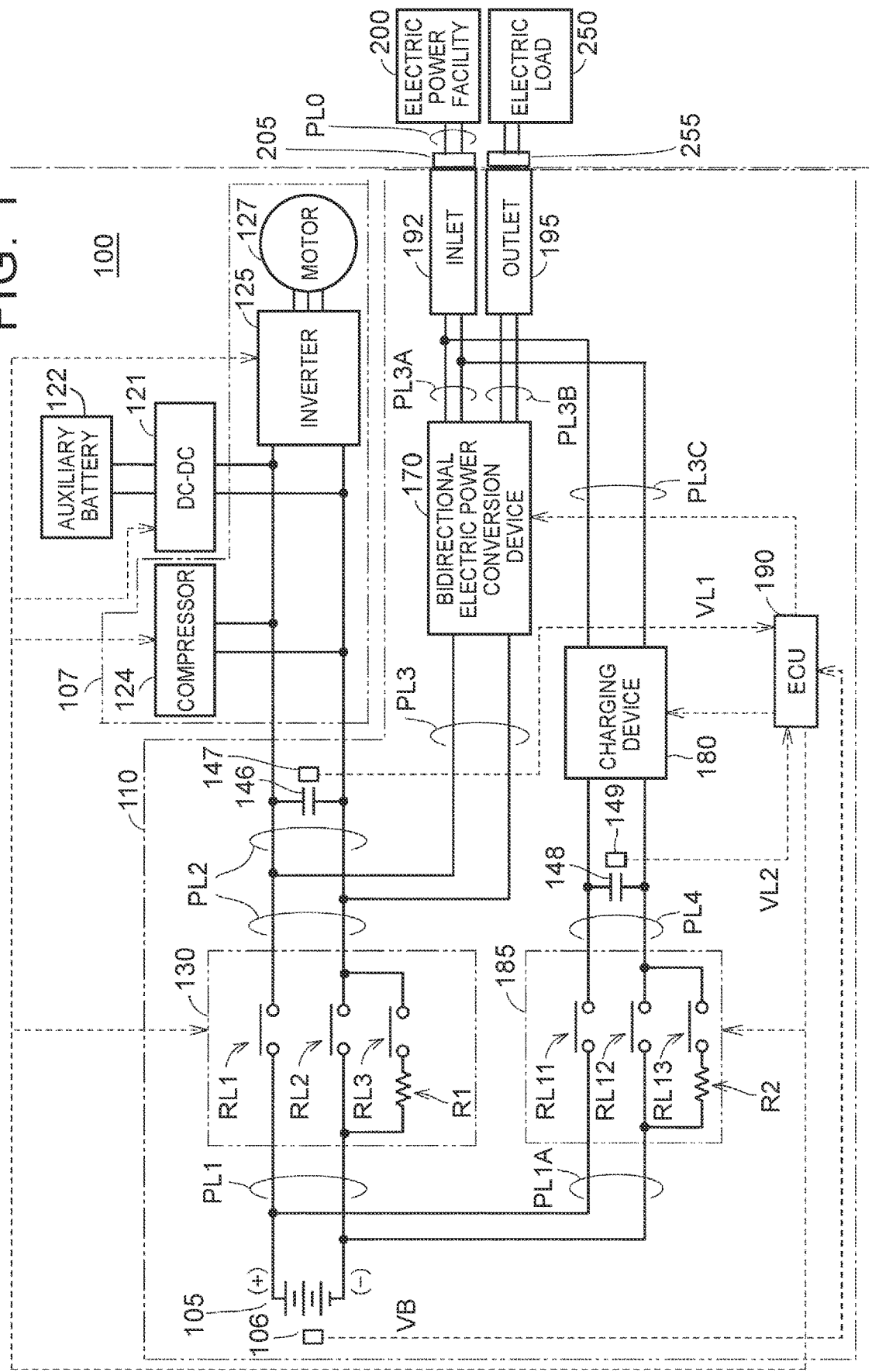
FIG. 1 is a diagram illustrating a configuration of a vehicle in which an electric power supply system according to an embodiment is installed.

FIG. 1 is a diagram illustrating a configuration of a vehicle in which an electric power supply system according to an embodiment of the disclosure is installed. Referring to FIG. 1, a vehicle 100 includes a DC (direct current)-DC converter 121, an auxiliary battery 122, electrical equipment 107, and an electric power supply system 110.

The DC-DC converter 121 is connected to an electric power line pair PL2 that connects a system main relay (SMR) 130 and an inverter 125 (both of which will be described later). The DC-DC converter 121 converts the electric power flowing over the electric power line pair PL2 into electric power of a voltage level (12 V) for the auxiliary battery 122. The DC-DC converter 121 can also convert the electric power supplied from the auxiliary battery 122 into electric power of a voltage level for the electrical equipment 107, and supply the converted electric power to the electric power line pair PL2.

The electrical equipment 107 includes a compressor 124, the inverter 125, and a motor 127. The compressor 124 is connected to the electric power line pair PL2, and is used for air conditioning in the vehicle 100. The inverter 125 is connected to the electric power line pair PL2, and drives the motor 127. The motor 127 is connected to the inverter 125, and generates traction force for the vehicle 100.

The electric power supply system 110 is connected to the electrical equipment 107, and includes an electric power storage device 105, a voltage sensor 106, the SMR 130, capacitors 146 and 148, voltage sensors 147 and 149, and a bidirectional electric power conversion device 170. The electric power supply system 110 further includes an inlet 192, an outlet 195, a charging device 180, a charging relay 185 and an electronic control unit (ECU) 190.

The electric power storage device 105 is a secondary battery such as a lithium-ion battery or the like, and stores electric power for the vehicle 100 to travel. The voltage sensor 106 detects a voltage VB of the electric power storage device 105.

The SMR 130 is provided between an electric power line pair PL1 connected to the electric power storage device 105, and the electric power line pair PL2 connected to the electrical equipment 107. The SMR 130 switches electrical connection between the electric power line pairs PL1 and PL2 between connection and disconnection. The SMR 130 includes relays RL1 to RL3 and a current-limiting resistor R1. An "off state" of the SMR 130 is a state in which the relays RL1 to RL3 are open. An "on state" of the SMR 130 is a state in which the relays RL1 and RL2 are closed. To "turn on" the SMR 130 is to switch the SMR 130 from the off state to the on state.

The capacitor 146 is provided between the electric power line pair PL2, and is used for smoothing a voltage VL1 between the electric power line pair PL2. The voltage sensor 147 detects the voltage VL1.

The bidirectional electric power conversion device 170 is connected to the electric power line pair PL2 via an electric power line pair PL3, connected to the inlet 192 (described later) via an electric power line pair PL3A, and connected to the outlet 195 (described later) via an electric power line pair PL3B.

The bidirectional electric power conversion device 170 is configured to execute bidirectional electric power conversion between the electric power line pair PL2 and an electric power facility 200 outside of the vehicle 100. The bidirectional electric power conversion device 170 functions as a charging device that converts the electric power received from the electric power facility 200 via the inlet 192, supplies the converted electric power to the electric power line pair PL3, and charges the electric power storage device 105 via the electric power line pair PL2 and the SMR 130 (external charging of vehicle 100). On the other hand, the bidirectional electric power conversion device 170 also functions as an electric power feed device that converts electric power received from the electric power storage device 105 via the electric power line pairs PL1, PL2, and PL3, and supplies the converted electric power to the electric power facility 200 via the inlet 192, or to an electric load 250 via the outlet 195 (external electric power feeding from vehicle 100).

The inlet 192 is configured to connect to the electric power facility 200 via a connector 205 and an electric power line pair PL0. Upon the connector 205 being inserted into the inlet 192, external charging or external electric power feeding from the vehicle 100 to the electric power facility 200 is enabled.

The outlet 195 is configured to connect to the electric load 250 via a plug 255 of the electric load 250 that is outside of the vehicle 100. Upon the plug 255 being inserted into the outlet 195, external electric power feeding from the vehicle 100 to the electric load 250 is enabled.

The charging device 180 is used to increase the amount of electric power charged in the electric power storage device 105. Specifically, when the charging device 180 operates in addition to the bidirectional electric power conversion device 170 during external charging, the charged electric power can be increased as compared to when only the bidirectional electric power conversion device 170 operates (charging time can be shortened).

Whether the charging device 180 operates may be decided in accordance with the rated output electric power of the electric power facility 200. For example, the operating state of the charging device 180 may be decided such that when the output electric power is great, the charging device 180 operates in addition to the bidirectional electric power conversion device 170, whereas when the output power is small, the charging device 180 does not operate (only the bidirectional electric power conversion device 170 operates).

The charging device 180 is connected to the electric power line pair PL3A via an electric power line pair PL3C, and is provided electrically in parallel with the bidirectional electric power conversion device 170. The charging device 180 is connected to the electric power line pair PL1 via an electric power line pair PL4, the charging relay 185 (described later), and an electric power line pair PL1A. The charging device 180 is configured to convert electric power supplied from the electric power facility 200 via the inlet 192 and the electric power line pair PL3C to charge the electric power storage device 105.

The charging relay 185 is connected to the electric power line pair PL1 via the electric power line pair PL1A, and is provided electrically in parallel with the SMR 130. The charging relay 185 is provided between the electric power line pair PL1 and the electric power line pair PL4 that is connected to the charging device 180. The charging relay 185 includes relays RL11 to RL13, and a current-limiting resistor R2. An "off state" of the charging relay 185 is a state in which the relays RL11 to RL13 are open. An "on state" of the charging relay 185 is a state in which the relays RL11 and RL12 are closed. To "turn on" the charging relay 185 is to switch the charging relay 185 from an off state to an on state.

The capacitor 148 is provided between the electric power line pair PL4, and is used for smoothing a voltage VL2 between the electric power line pair PL4. The voltage sensor 149 detects the voltage VL2.

The electric power line pairs PL1, PL2, and PL3, the SMR 130, the bidirectional electric power conversion device 170, and the charging device 180 make up a high-voltage system of the vehicle 100.

The ECU 190 includes a central processing unit (CPU) and memory (both omitted from illustration). The CPU executes various kinds of computation processing. The memory includes read-only memory (ROM) and random-access memory (RAM). The ROM stores programs that are executed by the CPU. The RAM functions as working memory.

The ECU 190 controls each device of the vehicle 100, such as the electrical equipment 107, the SMR 130, the bidirectional electric power conversion device 170, the charging device 180, the charging relay 185, and so forth. For example, when the connector 205 is inserted into the inlet 192, the ECU 190 activates the above-described high-voltage system (permits activation of the system) prior to external charging. The ECU 190 then turns on the SMR 130 and the charging relay 185, and operates both the bidirectional electric power conversion device 170 and the charging device 180 to execute external charging.

The ECU 190 executes switching processing of the SMR 130 and the charging relay 185 in accordance with the detected voltage values (e.g., voltages VB, VL1, VL2) of the electric power line pairs.

The ECU 190 executes, for example, first precharge processing of charging the capacitor 146 prior to turning on the SMR 130. In this example, the first precharge processing is processing of precharging the capacitor 146, by causing the DC-DC converter 121 to supply precharging electric power to the electric power line pair PL2. The ECU 190 is an example of a control device.

The ECU 190 executes second precharge processing of charging the capacitor 148 prior to turning on the charging relay 185. The second precharge processing is processing of controlling the relay RL13 so that the relay RL13 is in the closed state after controlling the relay RL11 so that the relay RL11 is in the closed state and prior to controlling the relay RL12 so that the relay RL12 is in the closed state. Thus, the capacitor 148 is precharged by the electric power storage device 105 in a situation in which the current is limited by the current-limiting resistor R2.

Figure 2:
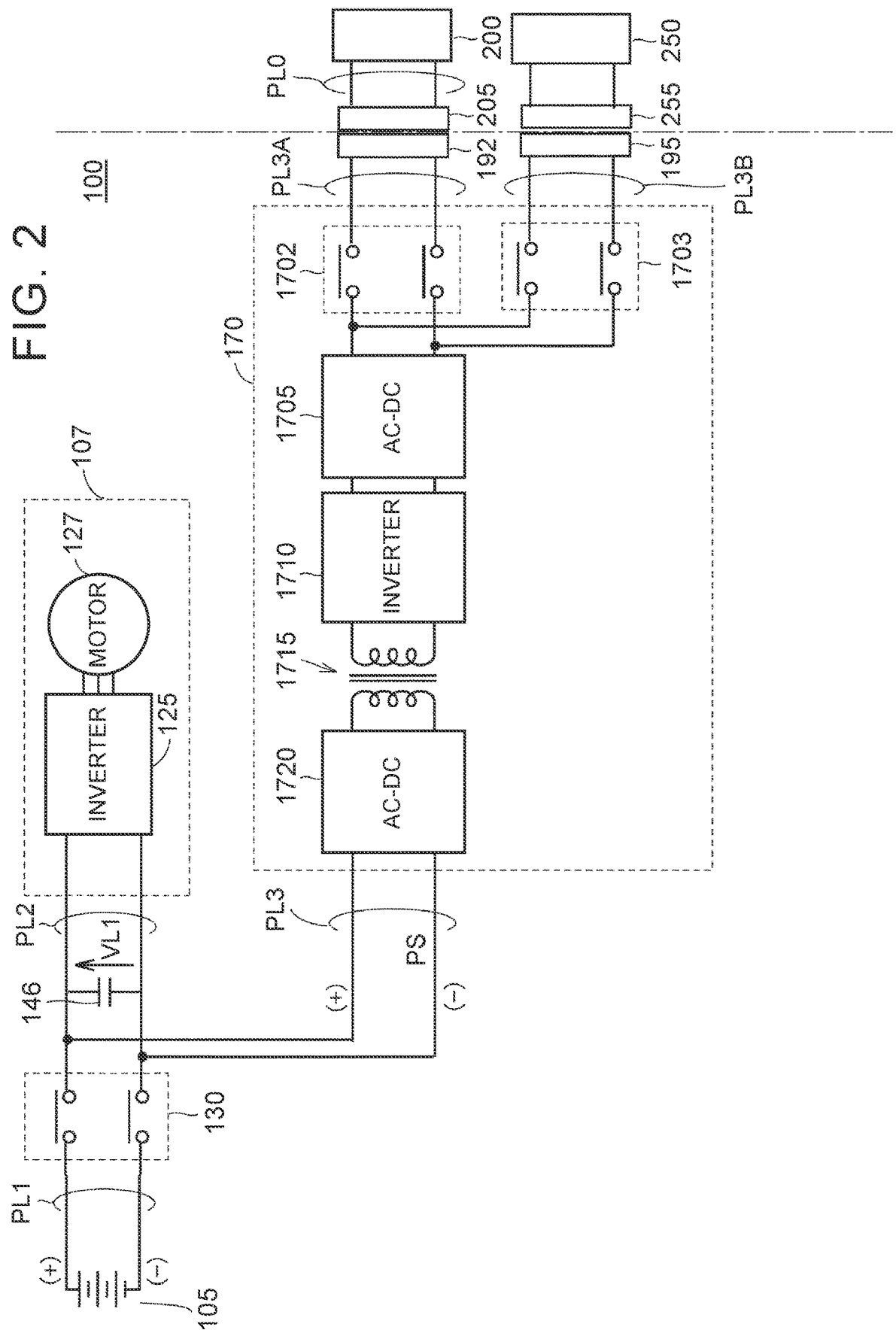
FIG. 2 is a diagram illustrating a detailed configuration of a bidirectional electric power conversion device.

FIG. 2 is a diagram illustrating a detailed configuration of the bidirectional electric power conversion device 170. Referring to FIG. 2, the bidirectional electric power conversion device 170 includes relays 1702 and 1703, an AC (alternating current)-DC conversion circuit 1705, an inverter 1710, a transformer 1715, and an AC-DC conversion circuit 1720.

The relay 1702 is controlled so that the relay 1702 is in a closed state during external charging or during external electric power feeding from the vehicle 100 to the electric power facility 200. The relay 1703 is controlled so that the relay 1703 is in a closed state during external electric power feeding from the vehicle 100 to the electric load 250. AC-DC conversion circuit 1705 converts alternating current electric power received by the inlet 192 into direct current electric power. The inverter 1710 converts the direct current electric power from the AC-DC conversion circuit 1705 into alternating current electric power. The transformer 1715 electrically isolates the inverter 1710 and the AC-DC conversion circuit 1720 from each other, while executing transmission of electric power therebetween.

The AC-DC conversion circuit 1720 converts alternating current electric power from the transformer 1715 into direct current electric power, and supplies the converted electric power to the electric power line pair PL2 via the electric power line pair PL3. The AC-DC conversion circuit 1720 can also convert the direct current electric power supplied from electric power storage device 105 via the electric power line pair PL1, the SMR 130, and the electric power line pair PL3 into alternating current electric power, and supply the converted electric power to the electric power facility 200 or the electric load 250 via the transformer 1715.

Figure 3:
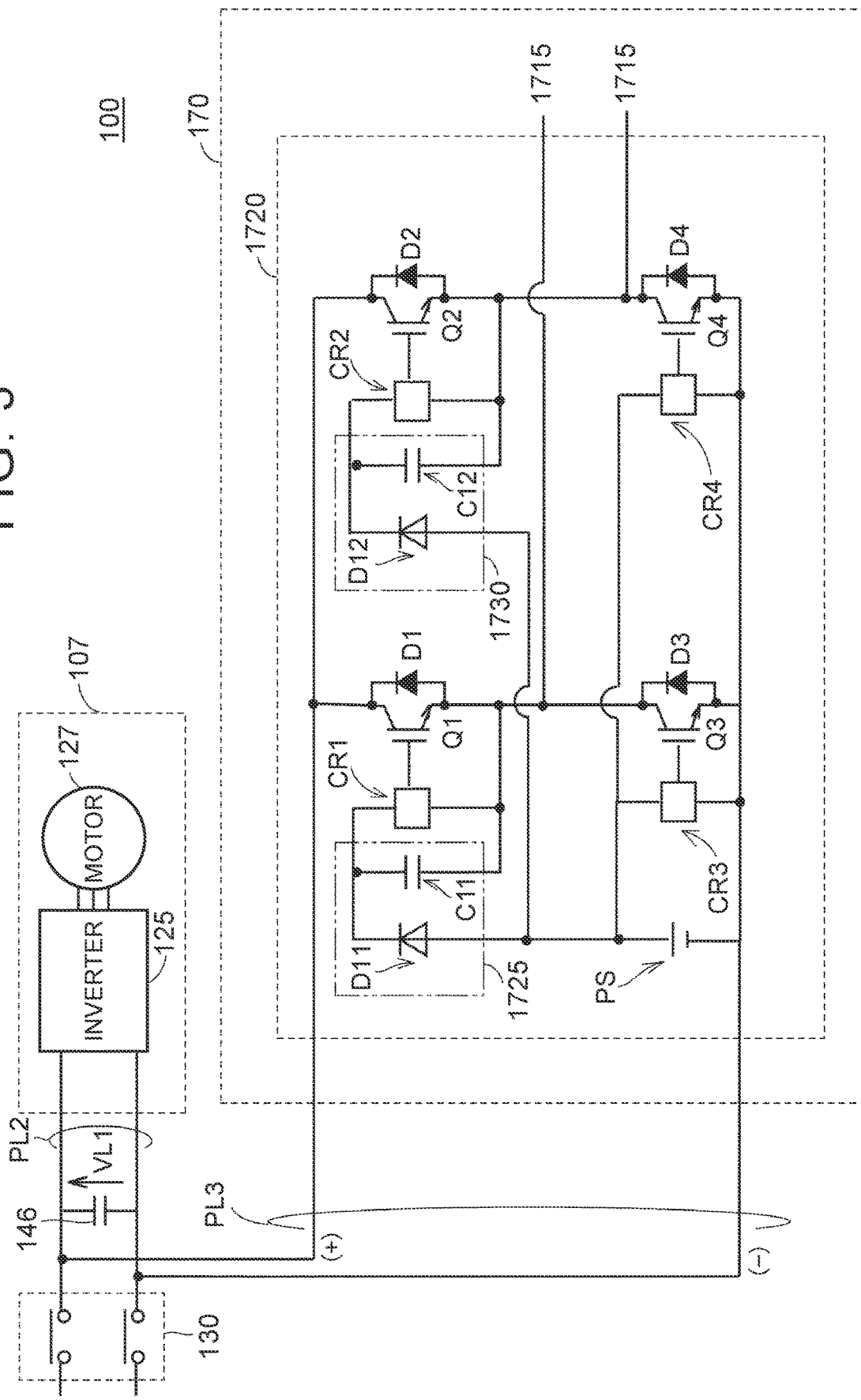
FIG. 3 is a diagram illustrating a detailed configuration of an alternating current (AC)-direct current (DC) conversion circuit.

FIG. 3 is a diagram illustrating a detailed configuration of the AC-DC conversion circuit 1720. Referring to FIG. 3, the AC-DC conversion circuit 1720 includes switching devices Q1 to Q4, diodes D1 to D4, driving circuits CR1 to CR4, an electric power supply PS, and bootstrap circuits 1725 and 1730.

Each of the switching devices Q1 to Q4 is a metal-oxide-semiconductor field-effect transistor (MOSFET) in this example, and is connected to the electric power line pair PL3. The diodes D1 to D4 are connected to the switching devices Q1 to Q4 by inverse-parallel connection, respectively.

The driving circuits CR1 to CR4 are configured to drive the gates of the switching devices Q1 to Q4, respectively. The driving circuits CR1 to CR4 output hold-off signals to the switching devices Q1 to Q4, respectively, so that the voltage from the transformer 1715 is not supplied to the electric power line pair PL2 via the electric power line pair PL3 prior to external charging is started. The hold-off signals are output to the respective gates of the switching devices Q1 to Q4, in order to maintain the switching devices Q1 to Q4 in the off state. The electric power supply PS is provided to supply operating electric power to the driving circuits CR3 and CR4.

The bootstrap circuits 1725 and 1730 include a diode D11 and a capacitor C11, and a diode D12 and a capacitor C12, respectively. The bootstrap circuits 1725 and 1730 are configured to supply operating electric power to the driving circuits CR1 and CR2 using the electric power supply PS, respectively. Specifically, electric power from the electric power supply PS is supplied to the capacitors C11 and C12 via the diodes D11 and D12, respectively. The electric power stored in the capacitors C11 and C12 is used as operating electric power for the driving circuits CR1 and CR2, respectively.

Thus, in a case in which the bidirectional electric power conversion device 170 includes the bootstrap circuits 1725 and 1730, the single electric power supply PS can supply operating electric power to the driving circuits CR1 to CR4. Accordingly, the configuration of the bidirectional electric power conversion device 170 can be simplified as compared with a case in which a plurality of electric power supplies supply operating electric power to the driving circuits CR1 to CR4.

Figure 4:
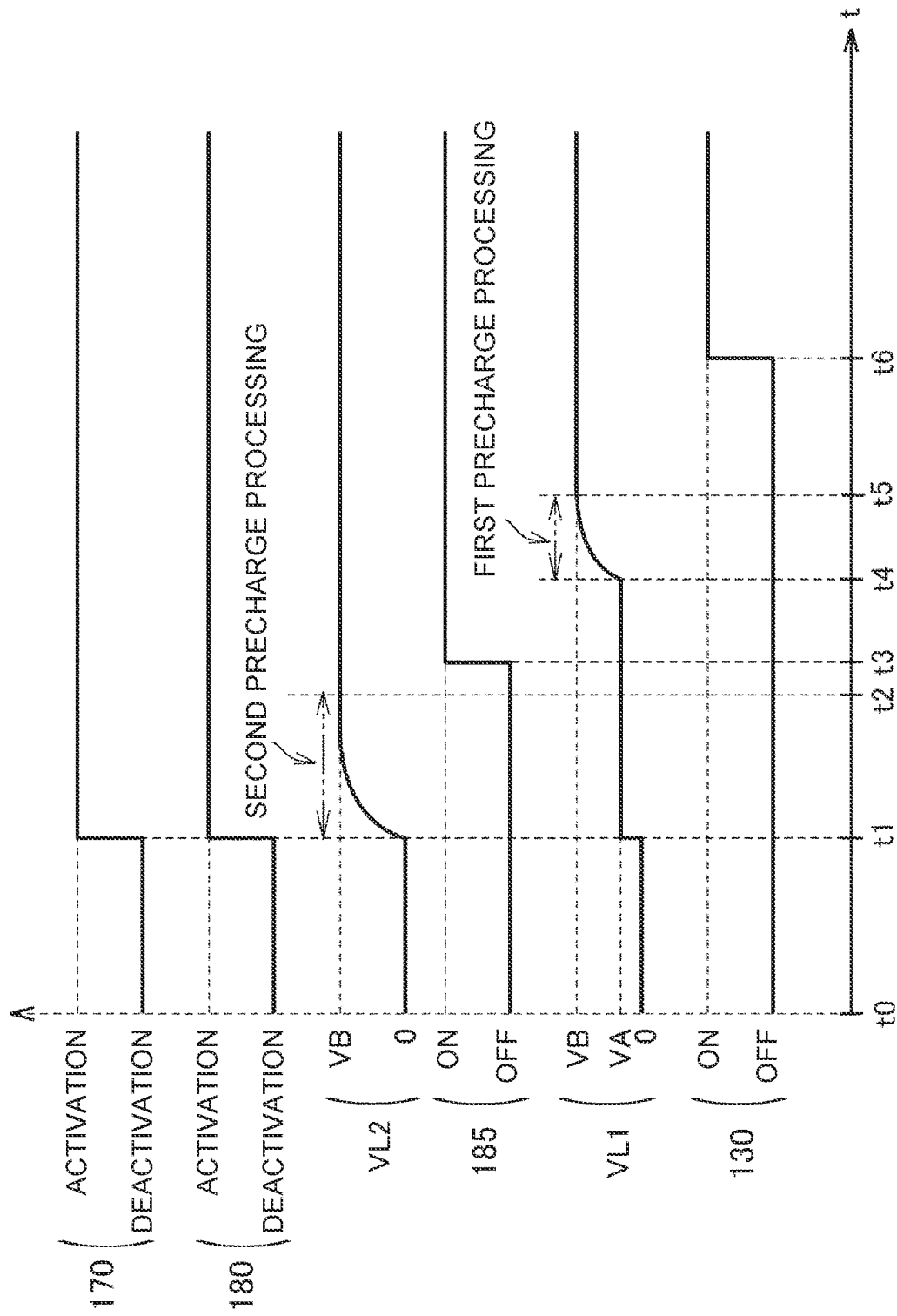
FIG. 4 is a timing chart for describing an example of processing executed when the bidirectional electric power conversion device and a charging device are activated.

FIG. 4 is a timing chart for describing an example of processing executed when the bidirectional electric power conversion device 170 and the charging device 180 are activated. In this example, the second precharge processing (precharging of the capacitor 148) is executed prior to the first precharge processing (precharging of the capacitor 146). This example is a comparative example in which the ECU 190, which will be described later, does not execute control.

Referring to FIG. 4, the horizontal axis represents time. Time t0 is a time at which the connector 205 is inserted into the inlet 192, and both the SMR 130 and the charging relay 185 will be assumed to be off at this time. The vertical axis represents activation/deactivation of the bidirectional electric power conversion device 170, activation/deactivation of the charging device 180, the voltage VL2, on/off of the charging relay 185, the voltage VL1, and on/off of the SMR 130, in that order from the top. FIGS. 1 to 3 will be referenced as appropriate in the following description.

At time t1, an ECU according to the comparative example activates the high-voltage system of the vehicle 100 (including the bidirectional electric power conversion device 170 and the charging device 180). This activates the electric power supply PS of the bidirectional electric power conversion device 170. The voltage from the electric power supply PS is then applied to the electric power line pair PL2 via the electric power line pair PL3, via the bootstrap circuit 1725 and the diode D1, and the bootstrap circuit 1730 and the diode D2. As a result, the voltage VL1 changes from 0 to VA (0<VA<<VB). Although VA is shown as being constant in this example, for the sake of convenience in illustration, in practice VA can vary within a range of greater than 0 and sufficiently smaller than VB. Accordingly, applying the voltage (VA) to the electric power line pair PL2 prior to the first precharge processing is not intended.

At time t1, the ECU starts the second precharge processing by switching the relays RL11 and RL13 from the open state to the closed state. Thereafter, the ECU executes the second precharge processing until time t2 arrives (until voltage VL2 reaches voltage VB). Then, at time t3, the ECU turns on the charging relay 185 by opening the relay RL13 and also closing the relay RL12.

At time t4, the ECU starts the first precharge processing by starting operation of the DC-DC converter 121. Thereafter, the ECU executes the first precharge processing until time t5 arrives (until voltage VL1 reaches voltage VB). Then, at time t6, the ECU turns on the SMR 130. Subsequently, external charging is started.

In the above comparative example, the second precharge processing is executed prior to the first precharge processing at the activation (time t1) of the bidirectional electric power conversion device 170 prior to external charging. Thus, voltage is applied to the electric power line pair PL2 from the bootstrap circuits 1725 and 1730 of the bidirectional electric power conversion device 170 prior to execution of the first precharge processing (prior to time t4). As a result, an unintended voltage (VA) is applied to the electric power line pair PL2.

The electric power supply system 110 according to the present embodiment has a configuration that can address the above issues. Specifically, ECU 190 starts the first precharge processing when the bidirectional electric power conversion device 170 is activated. According to such a configuration, precharging of the capacitor 146 and application of voltage from the bidirectional electric power conversion device 170 to the electric power line pair PL2 are performed simultaneously when the bidirectional electric power conversion device 170 is activated. The voltage applied from the bidirectional electric power conversion device 170 to the electric power line pair PL2 is sufficiently smaller than the voltage of the electric power for precharging of the capacitor 146 from the DC-DC converter 121. Accordingly, when the first precharge processing is started as described above, the voltage from the bidirectional electric power conversion device 170 to the electric power line pair PL2 is substantially masked by the voltage of the electric power for precharging of the capacitor 146. As a result, the effects on the electrical equipment 107 due to the application of voltage from the bidirectional electric power conversion device 170 to the electric power line pair PL2 can be suppressed.

In the present embodiment, the ECU 190 activates both the bidirectional electric power conversion device 170 and the charging device 180 prior to external charging. When activating both the bidirectional electric power conversion device 170 and the charging device 180, the ECU 190 starts the first precharge processing prior to the second precharge processing. If the second precharge processing is started prior to the first precharge processing, the voltage may be applied from the bootstrap circuits 1725 and 1730 to the electric power line pair PL2 prior to the first precharge processing as in the comparative example, and there is a possibility that an unintended voltage will be applied to the electrical equipment, such as the inverter 125 and so forth.

Conversely, in the present embodiment, the first precharge processing is executed prior to the second precharge processing and is executed when the bidirectional electric power conversion device 170 is activated. As a result, unintended voltage application to the electrical equipment can be averted.

Figure 5:
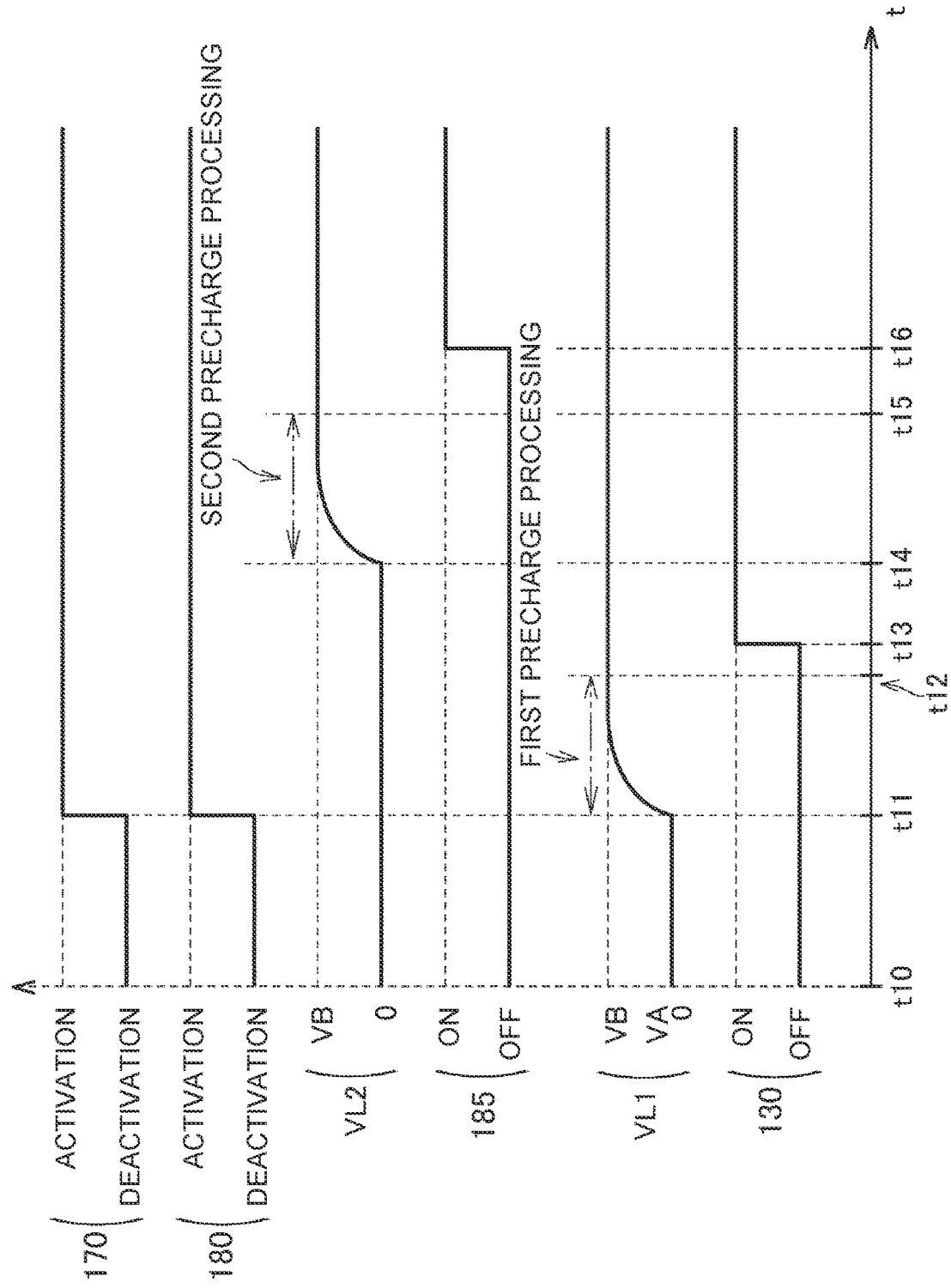
FIG. 5 is a timing chart for describing processing executed by an electronic control unit (ECU) when the bidirectional electric power conversion device and the charging device are activated.

FIG. 5 is a timing chart for describing processing executed by the ECU 190 when the bidirectional electric power conversion device 170 and the charging device 180 are activated. Referring to FIG. 5, the horizontal axis and the vertical axis are the same as those in the comparative example (FIG. 4). Times t10 and t11 are the same as times t0 and t1 in the comparative example, respectively. FIG. 5 is an example of an embodiment according to the present disclosure.

At time t11, the ECU 190 activates both the bidirectional electric power conversion device 170 and the charging device 180, and starts the first precharge processing. Accordingly, precharging of the capacitor 146 and application of the voltage from the bidirectional electric power conversion device 170 to the electric power line pair PL2 are performed simultaneously when the bidirectional electric power conversion device 170 is activated. As a result, the voltage from the bidirectional electric power conversion device 170 to the electric power line pair PL2 is substantially masked by the voltage of the precharging electric power for the capacitor 146. Accordingly, unintended voltage can be averted from being generated on the electric power line pair PL2.

The ECU 190 executes the first precharge processing until time t12 arrives (until voltage VL1 reaches voltage VB). At time t13, the ECU 190 turns on the SMR 130.

At time t14, the ECU 190 starts the second precharge processing. Thereafter, the ECU 190 executes the second precharge processing until time t15 arrives (until voltage VL2 reaches voltage VB). Then, at time t16, the ECU 190 turns on the charging relay 185. Subsequently, external charging is started.

Figure 6:
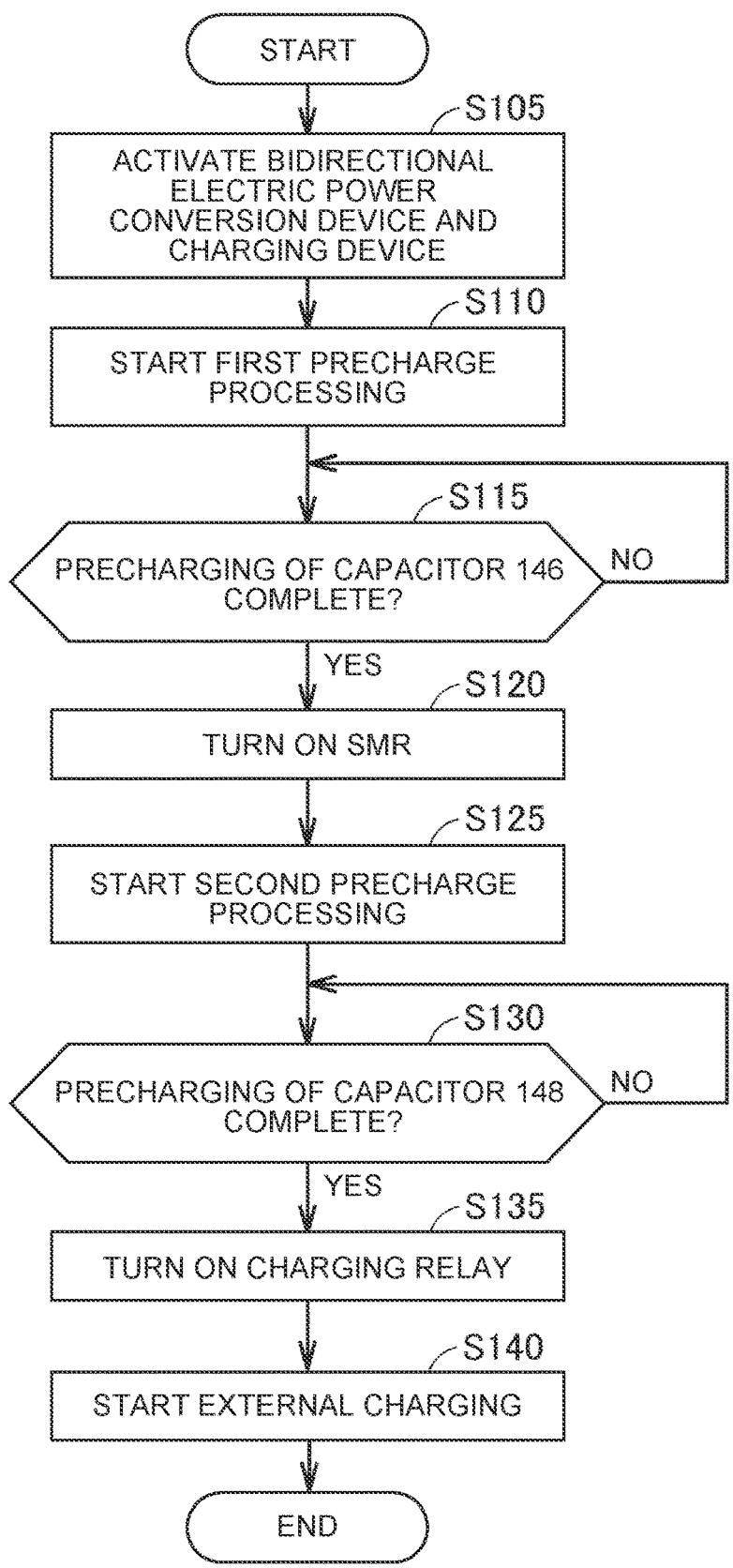
FIG. 6 is a flowchart showing an example of processing executed by the ECU in association with external charging.

FIG. 6 is a flowchart showing an example of processing executed by the ECU 190 in association with external charging. The processing of this flowchart is started when the connector 205 is inserted into the inlet 192. In the following description, FIG. 5 will be referenced as appropriate.

Referring to FIG. 6, at time t11, the ECU 190 activates the bidirectional electric power conversion device 170 and the charging device 180 (step S105), and starts the first precharge processing (step S110).

Next, the ECU 190 determines whether precharging of the capacitor 146 is complete (step S115). Specifically, ECU 190 executes this determination processing in accordance with whether the voltage VL1 has reached the voltage VB. When precharging is not yet complete (NO in step S115), the ECU 190 executes this determination processing until this precharging is complete. On the other hand, when precharging is complete (YES in step S115), the ECU 190 turns on the SMR 130 at time t13 (step S120).

Next, the ECU 190 starts the second precharge processing at time t14 (step S125).

Next, the ECU 190 determines whether precharging of the capacitor 148 is complete (step S130). Specifically, the ECU 190 executes this determination processing in accordance with whether the voltage VL2 has reached the voltage VB. When precharging is not yet complete (NO in step S130), the ECU 190 executes this determination processing until this precharging is complete. On the other hand, when precharging is complete (YES in step S130), the ECU 190 turns on the charging relay 185 at time t16 (step S135). Subsequently, the ECU 190 starts external charging (step S140).

As described above, according to the present embodiment, a situation can be averted in which an unintended voltage is applied to the electrical equipment, such as the inverter 125 and so forth, from the electric power supply PS via the bootstrap circuits 1725 and 1730, when the bidirectional electric power conversion device 170 is activated prior to the SMR 130 being turned on.

Modifications

The first precharge processing may be processing of controlling the relay RL3 of the SMR 130 so that the relay RL3 is in the closed state, after controlling the relay RL1 so that the relay RL1 to the closed state and prior to controlling the relay RL2 so that the relay RL2 is in the closed state. That is to say, the first precharge processing may be executed without using the DC-DC converter 121, in the same way as in the second precharge processing.

The embodiments disclosed herein should be understood as exemplary in all respects and not limiting. The scope of the disclosure is defined by the claims rather than by the above description, and is intended to include all modifications that fall within the meaning and scope equivalent to those of the claims.

What is claimed is:

1. An electric power supply system connected to electrical equipment, the electric power supply system comprising:
   an electric power storage device;
   a first relay provided between a first electric power line pair and a second electric power line pair, the first electric power line pair being connected to the electric power storage device and the second electric power line pair being connected to the electrical equipment;
   a bidirectional electric power conversion device that is connected to the second electric power line pair via a third electric power line pair, the bidirectional electric power conversion device being configured to be able to bidirectionally convert electric power between the second electric power line pair and an electric power facility outside of a vehicle;
   a first capacitor provided between the second electric power line pair;
   a control device configured to execute first precharge processing of charging the first capacitor prior to turning on the first relay;
   a charging device that is connected to the first electric power line pair, the charging device being configured to convert electric power supplied from the electric power facility to charge the electric power storage device;
   a second relay provided between the first electric power line pair and a fourth electric power line pair connected to the charging device; and
   a second capacitor provided between the fourth electric power line pair,
   wherein:
   the bidirectional electric power conversion device includes a switching device connected to the third electric power line pair,
   the control device starts the first precharge processing when the bidirectional electric power conversion device is activated;
   the control device is configured to further execute second precharge processing of charging the second capacitor prior to turning on the second relay, and the control device starts the first precharge processing prior to the second precharge processing when both the bidirectional electric power conversion device and the charging device are activated.

2. The electric power supply system according to claim 1, wherein the bidirectional electric power conversion device includes the switching device, a driving circuit for driving the switching device, and a bootstrap circuit that supplies operating electric power to the driving circuit.

3. The electric power supply system according to claim 1, wherein the control device is an electronic control unit.

4. The electric power supply system according to claim 2, wherein the control device is an electronic control unit.

* * * * *

UNITED STATES PATENT AND TRADEMARK OFFICE
CERTIFICATE OF CORRECTION

| | | |
|---|---|---|
| PATENT NO. | : 12,322,995 B2 | Page 1 of 1 |
| APPLICATION NO. | : 18/104626 | |
| DATED | : June 3, 2025 | |
| INVENTOR(S) | : Osamu Kitazawa | |

It is certified that error appears in the above-identified patent and that said Letters Patent is hereby corrected as shown below:

On the Title Page

In item (54), Title, and in the Specification Column 1, Line 2, delete "BIDIRECTTIONAL" and insert
-- BIDIRECTIONAL --

Signed and Sealed this
Ninth Day of September, 2025

Coke Morgan Stewart
*Acting Director of the United States Patent and Trademark Office*